(12) United States Patent
Rybicki et al.

(10) Patent No.: US 6,885,900 B1
(45) Date of Patent: Apr. 26, 2005

(54) METHOD AND APPARATUS FOR PROVIDING MULTIPLE CHANNEL AUDIO IN A COMPUTING SYSTEM

(75) Inventors: Mathew A Rybicki, Austin, TX (US); Giri N. K. Rangan, Austin, TX (US); Kenneth G Ifesinachukwa, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1045 days.

(21) Appl. No.: 09/613,344

(22) Filed: Jul. 10, 2000

(51) Int. Cl.[7] ............................................... G06F 17/00
(52) U.S. Cl. ......................................... 700/94; 381/81
(58) Field of Search ........................ 700/94, 306, 307, 700/122, 111, 77, 80, 81

(56) References Cited

U.S. PATENT DOCUMENTS 5,341,254 A * 8/1994 Ueno .......................... 360/62
5,841,993 A * 11/1998 Ho .............................. 381/309

* cited by examiner

Primary Examiner—Ping Lee
(74) Attorney, Agent, or Firm—Timothy W. Markison; Garlick, Harrison & Markison

(57) ABSTRACT

A method and apparatus for providing multiple channel audio in a computing system includes processing that begins by receiving an audio setup signal that indicates whether audio is to be outputted as stereo audio or multiple channel audio. When multiple channel audio is to be outputted, the line-in driver is disabled in the audio processing circuitry and the multiple channel driver of the audio processing circuitry is enabled. Thus, the multiple channel driver is operably coupled to the line-in audio jack. When the audio output is to be outputted as stereo audio, the multiple channel driver is disabled and the line-in driver is enable. Thus, the line-in driver is operably coupled to the line-in audio jack.

24 Claims, 4 Drawing Sheets

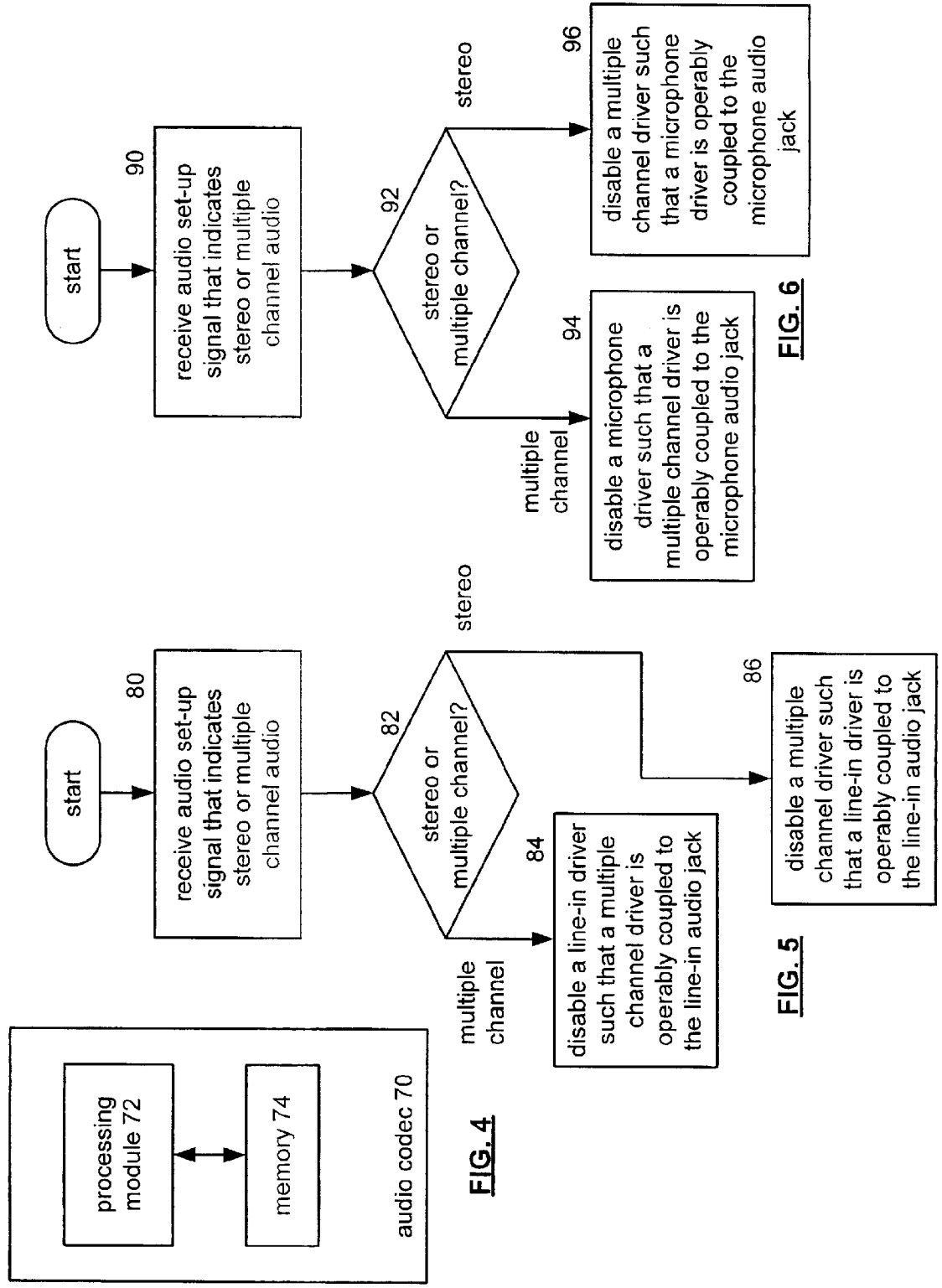

METHOD AND APPARATUS FOR PROVIDING MULTIPLE CHANNEL AUDIO IN A COMPUTING SYSTEM

TECHNICAL FIRLD OF THE INVENTION

This invention relates generally to computers and more particularly to audio processing in computers.

BACKGROUND OF THE INVENTION

As is known, personal computers (PC) and laptop computers include audio processing circuitry. Such audio processing circuitry allows a computer to play CDs, DVDs, etc. and produce audible sound therefrom. Current PCs and laptop computers include three audio jacks to facilitate the processing of audio. The three audio jacks are typically labeled line-in, microphone, and line-out. The line-in audio jack is used to receive analog audio signals from external devices, such as a CD player, cassette player, etc. The audio processing circuitry receives the analog audio signals via the line-in audio jack and converts the analog signals into digital signals, which can be manipulated by the computer. The audio processing circuitry also receives digital audio signals from the computer, converts them to analog signals, and provides the analog signals to speakers via the line-out audio jack. The digital audio signals may result from playback of a CD via an internal CD driver, mixed digital audio, etc. The audio processing circuitry may also receive analog audio signals via the microphone audio jack and convert these analog audio signals into digital audio signals for processing by the computer.

With advances in audio processing circuitry, surround-sound and other audio effects are readily available. For example, three-dimensional audio, audio synthesis via a wave table, pitch alterations, echo, etc. However, in the PC and laptop computing environments, such computing devices only include three audio jacks (line-in, line-out, and microphone). As such, current PC and laptop devices only accommodate stereo audio and not multi-channel or surround-sound audio.

Therefore, a need exists for a method and apparatus that provides multi-channel audio in a computing system.

BRIEF DESCRIPTION OF THE DRAWINGS

FIG. 4 illustrates a schematic block diagram of an audio codec in accordance with the present invention;

FIG. 5 illustrates a logic diagram of a method for providing multiple channel audio in a computing system in accordance with the present invention; and FIG. 6 illustrates a logic diagram of an alternate method for providing multiple channel audio in a computing system in accordance with the present invention.

DETAILED DESCRIPTION OF A PREFERRED EMBODIMENT

Generally, the present invention provides a method and apparatus for providing multiple channel audio in a computing system. Such a method and apparatus includes processing that begins by receiving an audio setup signal that indicates whether audio is to be outputted as stereo audio or multiple channel audio. When multiple channel audio is to be outputted, the line-in driver is disabled in the audio processing circuitry and the multiple channel driver of the audio processing circuitry is enabled. Thus, the multiple channel driver is operably coupled to the line-in audio jack. When the audio output is to be outputted as stereo audio, the multiple channel driver is disabled and the line-in driver is enable. Thus, the line-in driver is operably coupled to the line-in audio jack. With such a method and apparatus, multiple channel audio may be provided in a personal computer and/or laptop utilizing the existing three audio jacks.

Figure 1:
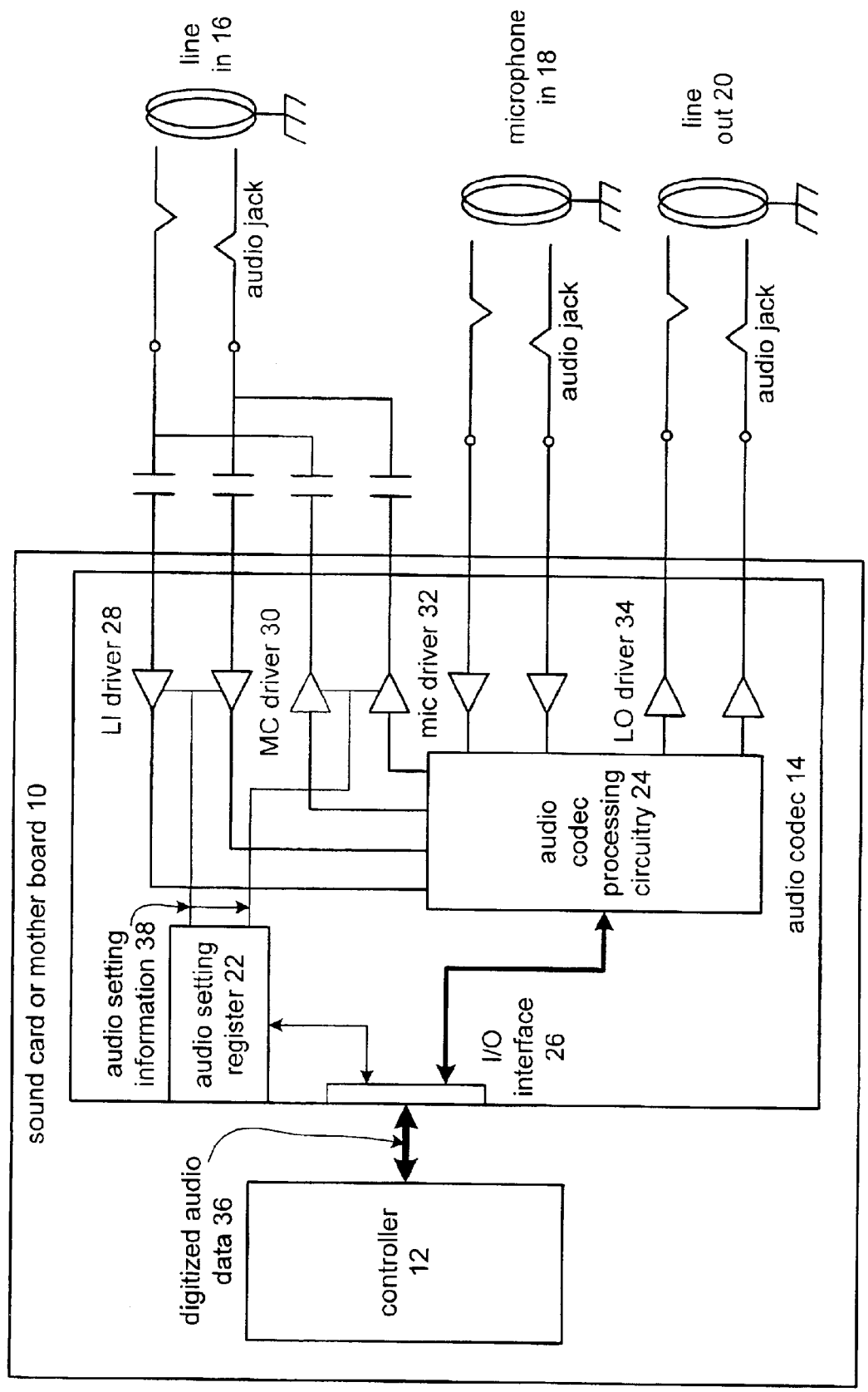
FIG. 1 illustrates a schematic block diagram of a soundcard or motherboard that includes circuitry for providing multiple channel audio in a computing system in accordance with the present invention.

The present inventions then were fully described with reference to FIGS. 1 through 6. FIG. 1 illustrates a schematic block diagram of a soundcard or motherboard 10 that includes a controller 12 and an audio codec 14. The soundcard or motherboard 10 is included in a personal computer, a laptop computer or other computing device that includes user audio inputs via audio jacks labeled line-in 16, microphone in 18 and line-out 20, or the equivalent thereof. The controller 12 may be an integrated digital controller or a software controller. The integrated digital controller is typically an integrated circuit that is mounted on the soundcard or the motherboard. A software controller is stored in system memory and executed by the central processing unit of the computer. In either implementation, the controller 12 provides an interface between the central processing unit and the audio codec 14. For example, if the audio processing is done in accordance with the AC 97 Specification, the controller 12 will function in accordance with the AC 97 Specification.

In AC97 applications, the controller communicates digitized audio data 36 with the audio codec 14. The digitized audio data 36 includes audio data and control data. The audio data includes left channel audio data, right channel audio data and, for multiple channel audio, left rear channel audio data, and right rear channel audio data. The control data indicates audio set-up data and other control data as specified in the AC97 Specification. The audio set-up data indicates whether the audio output is to be processed as stereo audio (i.e. only utilizing the left and right audio data) or multi-channel output (i.e. utilizing rear left and right audio data and the front left and right audio data).

The audio codec 14 includes the audio setting register 22, an input/output (I/O) interface 26, audio codec processing circuitry 24, a line-in driver 28 that includes left and right drivers, a multi-channel driver 30 that includes left and right drivers, a microphone driver 32, and a line-out driver 34 that includes left and right drivers. The audio codec processing circuitry 24 may be similar to the circuitry found in audio codecs produced and manufactured by SigmaTel, Inc. For example, the STAC 9708 designed and manufactured by SigmaTel, Inc. would include the circuitry contained in the audio codec processing circuitry 24.

In an AC97 Specification compliant system, the I/O interface 26 of the audio codec 14 communicates with the controller 12 via the AC link. The I/O interface 26 provides the audio data of the digitized audio data 36 to the audio codec processing circuitry 24 and provides the audio setup signal, or audio setting information 38, to the audio setting register 22. If the audio setting information 38 indicates that stereo operation is to be performed, the multi-channel driver 30 is disabled and the line-in driver 28 is enabled such that only the line-in driver 28 in operably coupled to the line-in audio jack 16. In this embodiment, the performance of the audio codec processing circuitry 24 with respect to the microphone driver 32 and line-out driver 34 is known.

When the audio setting information 38 indicates that multiple channel audio is to be implemented, line-in driver 28 is disabled and the multiple channel driver 30 is enabled. When multiple channel driver 30 is enabled, it is coupled to the line-in audio jack 16. When coupled in this manner, the line-in audio jack 16 is used as an output audio jack for providing the left and right rear audio signals to left and right rear speakers of a multi-channel audio system. In this configuration, a PC or laptop may provide surround sound audio without deviating from the current three audio jack implementation.

Figure 2:
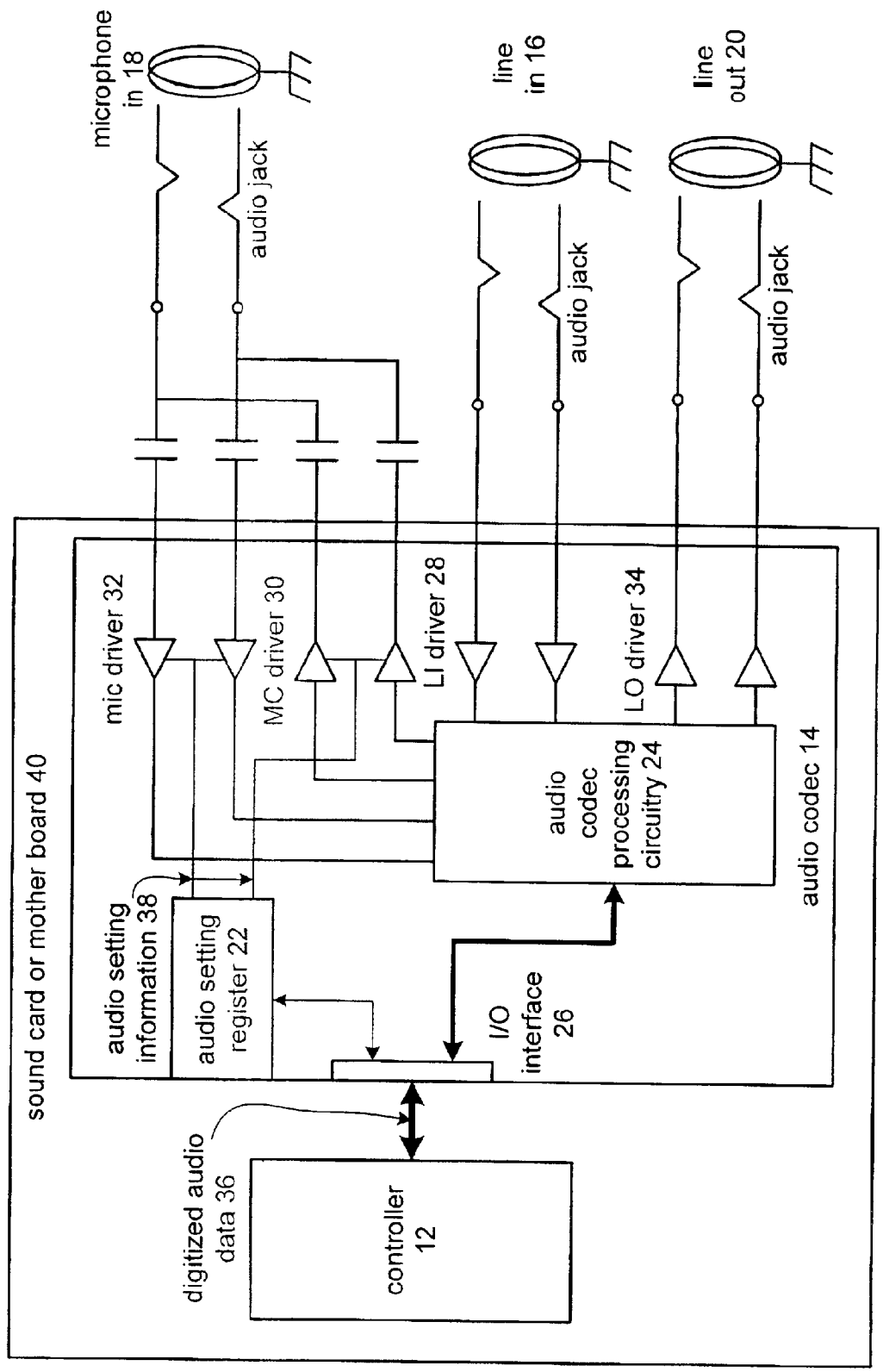
FIG. 2 illustrates a schematic block diagram of an alternate soundcard or motherboard that includes circuitry for providing multiple channel audio in a computing system in accordance with the present invention.

FIG. 2 illustrates an alternate sound card or motherboard 40, which includes the controller 12 and the audio codec 14. In this configuration, however, the microphone input audio jack 18 is used in a dual mode as opposed to the line-in audio jack 16. As such, when the audio setting information 38 indicates stereo operation, the multi-channel driver 30 is disabled and the microphone driver 32 is enabled such that only the microphone driver 32 is operably coupled to the microphone audio jack 18. Conversely, when the audio setting information 38 indicates multiple channel audio, the microphone driver 32 is disabled and the multiple channel driver 30 is enabled. When coupled in this manner, the microphone audio jack 18 is used as an output audio jack for providing the left and right rear audio signals to left and right rear speakers of a multi-channel audio system.

Figure 3:
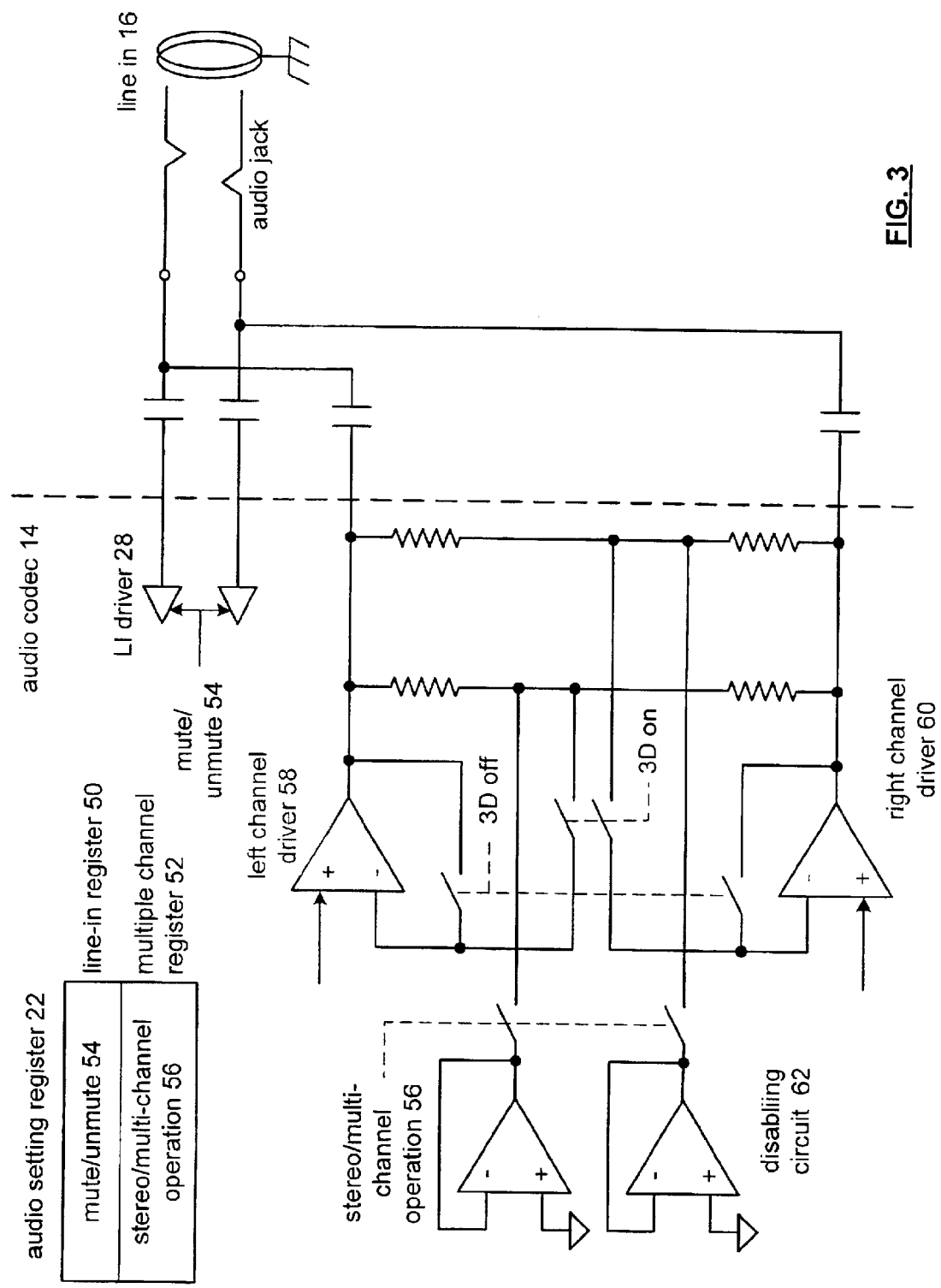
FIG. 3 illustrates a schematic block diagram of an audio codec that provides multiple channel audio in a computing system in accordance with the present invention.

FIG. 3 illustrates a detailed schematic block diagram of a portion of the audio codec 14. As shown, the multiple channel driver 30 includes a left channel driver 58 and a right channel driver 60, the audio setting register 22 includes a line-in register 50 and a multi-channel register 52, and the line-in driver 28 includes a right channel driver and a left channel driver. The left and right drivers of the line-in driver 28 are capacitively coupled to the line-in audio jack 16 as are the left and right drivers 58 and 60 of the multi-channel driver 30.

The audio setup signal, or audio setting information 38, includes mute/unmute information 54 and stereo/multi-channel operation information 56, which are stored in the line-in register 50 and the multiple channel register 52, respectively, of the audio setting register 22. When stereo operation is indicated, the mute/unmute signal indicates unmute mode while the stereo/multi-channel operation 56 indicates stereo mode. Conversely, when multi-channel operation is indicated, the mute/unmute signal indicates mute mode while the stereo/multi-channel operation 56 indicates multi-channel mode.

The multiple channel driver 30 further includes 3-D audio circuitry and a disabling circuit 62. The 3-D audio circuitry includes a resistive network and switching elements. In operation, the 3-D is enabled when the 3-D on switches are activated and the 3-D off switches are deactivate such that the outputs of the left channel driver 58 and right channel driver 60 are cross-coupled via the resistive network. When the 3-D is disabled, the 3-D off switches are enabled and the 3-D on switches are disabled such that the left and right channel drivers 58 and 60 operate as buffers.

The disabling circuit 62 includes a pair of drivers coupled to a reference potential within the audio codec 14. In operation, the disabling circuit switches are closed such that the center points of the resistive networks of the 3-D audio circuitry are coupled to the reference potential. This prevents cross coupling of the line-in signals via the resistive network and keeps the left side of the rear output capacitors biased to prevent turn on popping sounds. In addition, the left and right channel drivers 58 and 60 may be placed in a high impedance state. When multiple channel operation is indicated, the switches of the disabling circuit are opened thereby allowing the multiple channel driver 30 to provide surround sound audio signals to the line-in audio jack 16. In addition, the line-in driver 28 is placed in a mute state. Note that if the audio codec 14 does not include the 3-D audio circuitry, the disabling circuit would include a resistor coupled from each rear output and to bias the capacitors.

FIG. 4 illustrates a schematic block diagram of an audio codec 70 that includes a processing module 72 and memory 74. The processing module 72 may be a single processing device or a plurality of processing devices. Such a processing device may be a microprocessor, microcontroller, digital signal processor, state machine, logic circuitry, and/or any device that processes signals (e.g. analog or digital) based on operational instructions. The memory 74 may be a single memory device or a plurality of memory devices. Such a memory device may be read only memory, random access memory, flash memory, system memory, and/or any device that stores digital information. Note that when the processing module 72 implements one or more of its functions via a state machine or logic circuitry, the memory storing the corresponding operational instructions is imbedded within the circuitry comprising the state machine and logic circuitry. The operational instructions stored in memory 74 and executed by processing module 72 are illustrated in FIGS. 5 and 6.

FIG. 5 illustrates a logic diagram of a method for providing multiple channel audio in a computing system. The process begins at Step 80 where an audio setup signal is received, wherein the audio setup signal indicates whether stereo audio or multiple channel audio is to be processed. The process then proceeds to Step 82 where a determination is made as to whether the audio is to be outputted as stereo audio or as multiple channel audio. Note that the determination is made based on a user selection, auto detection of speakers coupled to an input jack, or sensing the coupling of the audio jacks. When the audio is to be outputted as multiple channel audio, the process proceeds to Step 84 where a line-in driver is disabled such that a multiple channel driver is operably coupled to the line-in audio jack. If, however, the audio is to be outputted as stereo audio, the process proceeds to Step 86. At Step 86, a multiple channel driver is disabled such that a line-in driver is operably coupled to the line-in audio jack.

FIG. 6 illustrates an alternate method that begins at Step 90 where an audio setup signal that indicates stereo audio operation or multiple channel audio operation is received. The process then proceeds to Step 92 where a determination is made as to whether audio is to be outputted as stereo audio or multiple channel audio. When the audio is to be outputted as multiple channel audio, the process proceeds to Step 94. At Step 94 a microphone driver is disabled such that a multiple channel driver is operably coupled to the microphone audio jack. If, however, stereo audio is to be outputted the process proceeds to Step 96. At Step 96, a multiple channel driver is disabled such that a microphone driver is operably coupled to the microphone audio jack.

The preceding discussion has presented a method and apparatus for providing multi-channel audio in a computing system such as a personal computer or laptop computer. By including in the audio codec circuitry to switch between stereo and multiple channel audio, a personal computer or laptop can readily provide multiple channel audio. As one of average skill in the art will appreciate, other embodiments may be derived from the teaching of the present invention without deviating from the scope of the claims.

What is claimed is:

1. A method for providing multiple channel audio in a computing system, the method comprises the steps of:
   receiving an audio setup signal that indicates whether audio is to be outputted as stereo audio or multiple channel audio having more than two audio output channels;
   when the multiple channel audio is to be outputted, disabling a line-in driver such that a multiple channel driver is operably coupled to an audio jack; and
   when the stereo audio is to be outputted, disabling the multiple channel driver such that the line-in driver is operably coupled to the audio jack.

2. The method of claim 1, wherein the step of receiving the audio setup signal further comprises:
   receiving line-in driver setting information and multiple channel driver setting information;
   storing the line-in driver setting information in a line-in driver register; and
   storing the multiple channel driver setting information in a multiple channel register.

3. The method of claim 1, wherein the disabling the line-in driver further comprises muting the line-in driver.

4. The method of claim 1, wherein the disabling the multiple channel driver further comprises placing the multiple channel driver in a high impedance state.

5. An audio codec comprising:
   an input/output interface operably coupled to receive and transmit digitized audio data;
   an audio setting register that stores audio setting information contained in the digitized audio data;
   a line-in driver operably coupled to an external audio jack when the audio setting information indicates stereo audio operation and is disabled when the audio setting information indicates multiple channel audio operation wherein said multiple channel audio operation involves more than two audio output channels; and
   a multiple channel driver operably coupled to the external audio jack when the audio setting information indicates multiple channel audio operation and is disabled when the audio setting information indicates stereo audio operation.

6. The audio codec of claim 5, wherein the audio setting register further comprises:
   multiple channel register that stores multiple channel setting information of the audio setting information; and
   a line-in register that stores line-in setting information of the audio setting information.

7. The audio codec of claim 5, wherein the multiple channel driver further comprises:
   a left channel driver;
   a right channel driver; and
   a disabling circuit operably coupled to the left channel driver and the right channel driver, wherein the disabling circuit disables the left channel driver and the right channel driver when the audio setting information indicates stereo operation.

8. The audio codec of claim 7, wherein the disabling circuit causes the left and right channel drivers to have a high impedance with respect to the external audio jack when the audio setting information indicates the stereo operation.

9. An audio codec comprises:
   a processing module; and
   memory operably coupled to the processing module, wherein the memory stores operational instructions that cause the processing module to:
      receive an audio setup signal that indicates whether audio is to be outputted as stereo audio or multiple channel audio having more than two audio output channels;
      when the multiple channel audio is to be outputted, disable a line-in driver such that a multiple channel driver is operably coupled to an audio jack; and
      when the stereo audio is to be outputted, disable the multiple channel driver such that the line-in driver is operably coupled to the audio jack.

10. The audio codec of claim 9, wherein the memory further comprises operational instructions that cause the processing module to receive the audio setup signal by:
    receiving line-in driver setting information and multiple channel driver setting information;
    storing the line-in driver setting information in a line driver register; and
    storing the multiple channel driver setting information in a multiple channel register.

11. The audio codec of claim 9, wherein the memory further comprises operational instructions that cause the processing module to disable the line-in driver by muting the line in driver.

12. The audio codec of claim 9, wherein the memory further comprises operational instructions that cause the processing module to disable the multiple channel driver by placing the multiple channel driver in a high impedance state.

13. A method for providing multiple channel audio in a computing system, the method comprises the steps of:
    receiving an audio setup signal that indicates whether audio is to be outputted as stereo audio or multiple channel audio having more than two audio output channels;
    when the multiple channel audio is to be outputted, disabling a microphone driver such that a multiple channel driver is operably coupled to an audio jack; and
    when the stereo audio is to be outputted, disabling the multiple channel driver such that the microphone driver is operably coupled to the audio jack.

14. The method of claim 13, wherein the step of receiving the audio setup signal further comprises:
    receiving microphone driver setting information and multiple channel driver setting information;
    storing the microphone driver setting information in a microphone driver register; and
    storing the multiple channel driver setting information in a multiple channel register.

15. The method of claim 13, wherein the disabling the microphone driver further comprises muting the microphone.

16. The method of claim 13, wherein the disabling the multiple channel driver further comprises lacing the multiple channel driver in a high impedance state.

17. An audio codec comprising:
    an input/output interface operably coupled to receive and transmit audio data;
    an audio setting register that stores audio setting information contained in the audio data;
    a microphone driver operably coupled to an external audio jack when the audio setting information indicates stereo audio operation and is disabled when the audio setting information indicates multiple channel audio operation wherein said multiple channel audio operation involves more than two audio output channels; and a multiple channel driver operably coupled to the external audio jack when the audio setting information indicates multiple channel audio operation and is disabled when the audio setting, information indicates stereo audio operation.

18. The audio codec of claim 17, wherein the audio setting register further comprises:

multiple channel register that stores multiple channel setting information of the audio setting information; and a microphone register that stores microphone setting information of the audio setting information.

19. The audio codec of claim 17, wherein the multiple channel driver further comprises:

a left channel driver;

a right channel driver; and a disabling circuit operably coupled to the left channel driver and the right channel driver, wherein the disabling circuit disables the left channel driver and the right channel driver when the audio setting information indicates stereo operation.

20. The audio codec of claim 19, wherein the disabling circuit causes the left and right channel drivers to have a high impedance with respect to the external audio jack when the audio setting information indicates the stereo operation.

21. An audio codec comprises:

a processing module; and memory operably coupled to the processing module, wherein the memory stores operational instructions that cause the processing module to:

receive an audio setup signal that indicates whether audio is to be outputted as stereo audio or multiple channel audio having more than two audio output channels;

when the multiple channel audio is to be outputted, disable a microphone driver such that a multiple channel driver is operably coupled to an audio jack; and when the stereo audio is to be outputted, disable the multiple channel driver such that the microphone driver is operably coupled to the audio jack.

22. The audio codec of claim 21, wherein the memory further comprises operational instructions that cause the processing module to receive the audio setup signal by:

receiving microphone driver setting information and multiple channel driver setting information;

storing the microphone driver setting information in a microphone driver register; and storing the multiple channel driver setting information in a multiple channel register.

23. The audio codec of claim 21, wherein the memory further comprises operational instructions that cause the processing module to disable the microphone driver by muting the microphone driver.

24. The audio codec of claim 21, wherein the memory further comprises operational instructions that cause the processing module to disable the multiple channel driver by placing the multiple channel driver in a high impedance state.

* * * * *